United States Patent [19]

Plunk

[11] Patent Number: 5,259,037
[45] Date of Patent: Nov. 2, 1993

[54] AUTOMATED VIDEO IMAGERY DATABASE GENERATION USING PHOTOGRAMMETRY

[75] Inventor: Gerald W. Plunk, Diamond Bar, Calif.

[73] Assignee: Hughes Training, Inc., Arlington, Tex.

[21] Appl. No.: 651,819

[22] Filed: Feb. 7, 1991

[51] Int. Cl.$^5$ .......................... G06K 9/00; G01C 21/00
[52] U.S. Cl. ........................................... 382/1; 382/45; 364/456; 364/458; 358/103
[58] Field of Search ............... 382/1, 44, 45; 364/443, 364/458, 456; 358/103; 356/12, 20; 434/38

[56] References Cited

U.S. PATENT DOCUMENTS

| | | | |
|---|---|---|---|
| 4,635,203 | 1/1987 | Merchant | 364/458 |
| 4,695,959 | 9/1987 | Lees et al. | 364/458 |
| 4,954,837 | 9/1990 | Baird et al. | 342/458 |
| 4,984,279 | 1/1991 | Kidney et al. | 382/1 |
| 4,988,189 | 1/1991 | Kroupa et al. | 356/4 |

OTHER PUBLICATIONS

Merchant, "Exact Area Registration of Different Views of a Common Object Scene," *Optical Engineering*, vol. 20, No. 3, May/Jun. 1981, pp. 424-436.

Primary Examiner—Leo H. Boudreau
Assistant Examiner—Andrew W. Johns
Attorney, Agent, or Firm—Wanda K. Denson-Low

[57] ABSTRACT

A method for converting forward looking video or motion picture imagery into a downlooking database suitable for use in an image generation system to generate realtime perspective images for simulation purposes. A digital video camera photographs a sequence of forward looking frames along a course including several known ground control points. Digital data from the digital video camera is read into a computer. The initial position and the position of ground control points is read into the computer. A Kalman filter technique provides continuous estimates of exact camera location in x, y, z coordinates, and in roll, pitch and yaw orientation. A correlation filter determines corresponding pixels in adjacent frames. Range from the camera to the pixel surfaces is calculated to determine the x, y and z position thereof. A modified mathematical stereophotogrammetry technique is used. Radiometric data and elevation data is extracted from the lower portion of the frame for each pixel. After the radiometric and elevation data have been established for each pixel in each frame, the imagery is warped onto the elevation data to generate a top down view. The database is then ready for use in an image generation system.

10 Claims, 1 Drawing Sheet

AUTOMATED VIDEO IMAGERY DATABASE GENERATION USING PHOTOGRAMMETRY

BACKGROUND

The present invention relates to the field of photogrammetry, and, more particularly, to a method for automatically generating a three-dimensional video imagery photographic database.

An image generation system such as the Computer Generated Synthesized Imagery (CGSI) system requires a video imagery database in order to generate realtime perspective images for use in simulators such as simulated flight trainers. Heretofore, such video imagery databases have been generated by taking downlooking aerial photographs, developing the film, assembling and registering the photographs into a mosaic pattern encompassing the terrain of interest, digitizing the photographs, performing radiometric balancing, and performing orthorectification by registering the photographs to elevation data such as that provided by the Defense Mapping Agency.

Unfortunately, photographic visual databases require a large expenditure of time and money. Also, photographic data is typically not up-to-date. Frequently, no elevation data exists for the terrain of interest, no photography of the area exists, and no stereo pair imagery exists.

Accordingly, it is an objective of the present invention to provide a method for automatically generating a three-dimensional photographic database that requires less manual intervention, that can be completed in a shorter time, that does not require film processing nor film digitization, and that allows databases to be generated of areas for which no elevation data, photography or stereo pair imagery exists.

SUMMARY OF THE INVENTION

In accordance with the principles of the present invention, an aircraft flies over known ground features used as ground control points. Pictures are taken of the ground from an oblique point of view using a camera such as a motion picture camera or a videocamera. After the flight, the film is processed to obtain digitized photographs which are fed directly into an automatic database generating computer. No attempt is made at registration, radiometric balancing, orthorectification, or making a mosaic of multiple images. Thus, the method of the present invention is less time-consuming and labor intensive than conventional techniques employing downlooking photographs. The method of the present invention uses less manual intervention and generates databases in a shorter period of time, from data acquisition through database completion. The automatic database generating computer calculates the position of the aircraft for each frame based on known ground control points on maps of the terrain. On overlapping areas of common coverage in adjacent frames, the position of the aircraft is calculated to the same ground feature from the displaced camera positions. This process is continued with other additional points or ground features until about 20 common points have been calculated for adjacent frames. In addition to making calculations from frame-to-frame, the computer also skips over some frames and makes calculations of position from about every sixth frame. In this manner, the calculations are continually refined. The automatic database generating computer makes use of modern extended Kalman filtering techniques to provide optimal estimates of the position and attitude of the aircraft with respect to each frame of imagery. This provides a continuous smooth determination of the orientation of the camera at the moment of exposure of each frame. The Kalman filter estimation of the vehicle position and attitude is made with respect to six degrees of freedom: x, y, z and roll, pitch and yaw. The automatic database generating computer uses a correlation filter to determine corresponding pixels in adjacent frames. The computer calculates range to these corresponding pixel surfaces from the displaced camera positions, and determines the x, y and z position. The elevation data and radiometric data for each pixel is determined. The radiometric data is extracted only from the lower portion of each frame because it is closer to the camera. The radiometric data for each pixel is given in terms of eight digital bits which represent 256 elements of information. Finally, the imagery is warped onto the elevation data to generate a top down view. The resulting database is used in image generation systems such as the CGSI system to generate perspective images for use in simulators.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
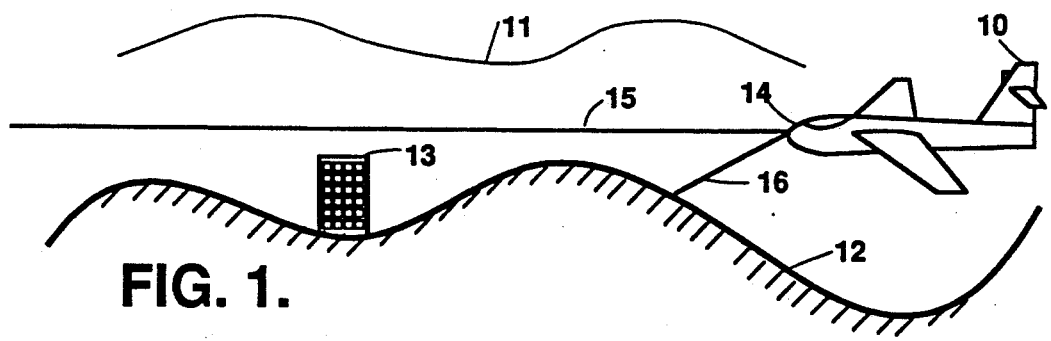
FIG. 1 shows an aircraft taking oblique aerial photographs as it flys over terrain of interest.

Referring now to the drawings, FIG. 1 shows an aircraft 10 flying along a flight path 11 over undulating terrain 12 including a building 13. On board the aircraft 10 is a camera 14 taking sequential aerial photographs of the terrain 12. The camera 14 has an oblique field of view as indicated by two lines 15, 16 in FIG. 1. The camera 14 may be a video camera or a motion picture camera, or the like, which produces a sequence of frames of imagery along the flight path 11. There are substantial areas of overlap between adjacent frames of imagery in the sequence. It will be understood that a single camera 14 is used to make the sequence of frames of imagery. Stereo pairs of cameras are not used, although as will be pointed out hereinafter, modified principles of stereo pair photogrammetry are used to process data derived from the sequence of frames of imagery.

Figure 2:
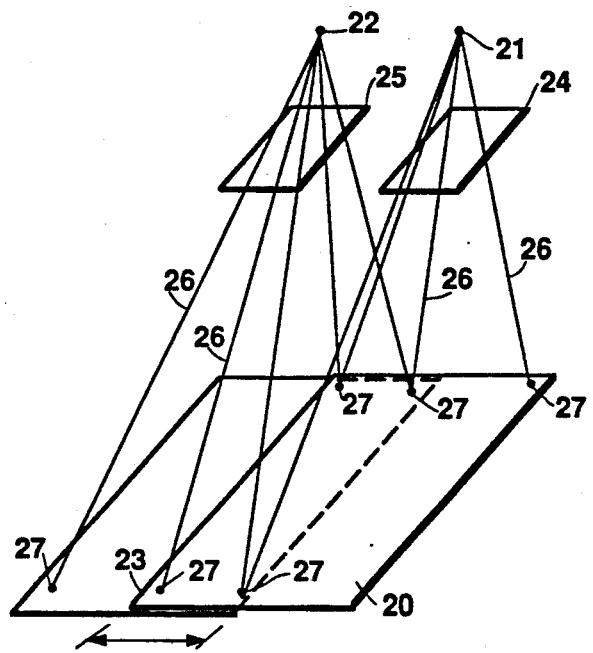
FIG. 2 is a diagram illustrating the geometric principle of stereophotogrammetry.

Referring now to FIG. 2, there is shown a diagram illustrating the geometric principle of stereophotogrammetry. It should be clearly understood that each image point on a photograph corresponds to a unique point in the object scene. A geometric relationship exists between image points in a two-dimensional photograph and corresponding locations in three-dimensional object space. There exists a method in the field of mathematics that solves the problem of stereoscopic pairs of downlooking photographs that are taken at the same time from slightly different vantage points. In FIG. 2, a surface area 20 is photographed from two different camera positions 21, 22. An area of common coverage 23 by the two photographs is called stereoscopic overlap. Photographic films at the two different camera positions 21, 22 record the imagery of the surface area 20 being photographed. A plurality of lines 26 represent light rays that extend from discrete points 27 on the surface area 20 to the camera positions 21, 22. Photographs 24, 25 made from the film are shown in FIG. 2 having the plurality of lines 26 passing therethrough.

Each of the photographs 24, 25 may be considered as a record of the bundle of light rays which travel from object space, pass through a lens system and register on photographic film. In a first method of making measurements, an optical model of the stereoscopic overlap area of common coverage 23 is constructed in an instrument known as a stereoplotter which comprises two projectors. Each bundle of rays is reconstructed by inserting either a glass plate diapositive or film negative into one of the projectors. The two projectors are translated and tilted until they assume the same relative position and attitude as when the photographs were taken in the two camera positions 21, 22. When the projectors have been properly positioned, corresponding light rays in the two bundles intersect in space and a three-dimensional optical model is formed. Finally, points of known ground positions (called control points) are used to scale the model and to level it with respect to the reference plane in the stereoplotter. Once orientation is completed, the position of any point in the stereo model may be measured at the intersection of the two corresponding rays from the two projectors.

In a second method of making photogrammetric measurements called computational photogrammetry, the path of each ray of light is described by a mathematical expression which is a function of the position of a point in the object space, position of the corresponding image point in the photograph, position of the exposure center in the ground reference system, direction of the optical axis of the camera and the perspective geometry of the camera. If the perspective geometry of the camera has been determined by camera calibration, and if three or more control points are imaged on a photograph, the position of the camera and its attitude with respect to the ground control reference system can be determined. Once the orientation of both of the photographs 24, 25 of a stereoscopic pair is known, the position of any object point which is located in the overlap area of common coverage 23 may be computed as the point of intersection of two rays. It should be noted that in both the stereoplotter and computational method of making photogrammetric measurements, determination of the orientation of the camera at the moment of exposure is a necessary step in the measurement process. This orientation is expressed in six degrees-of-freedom: x, y, z and roll, pitch and yaw.

Figure 3:
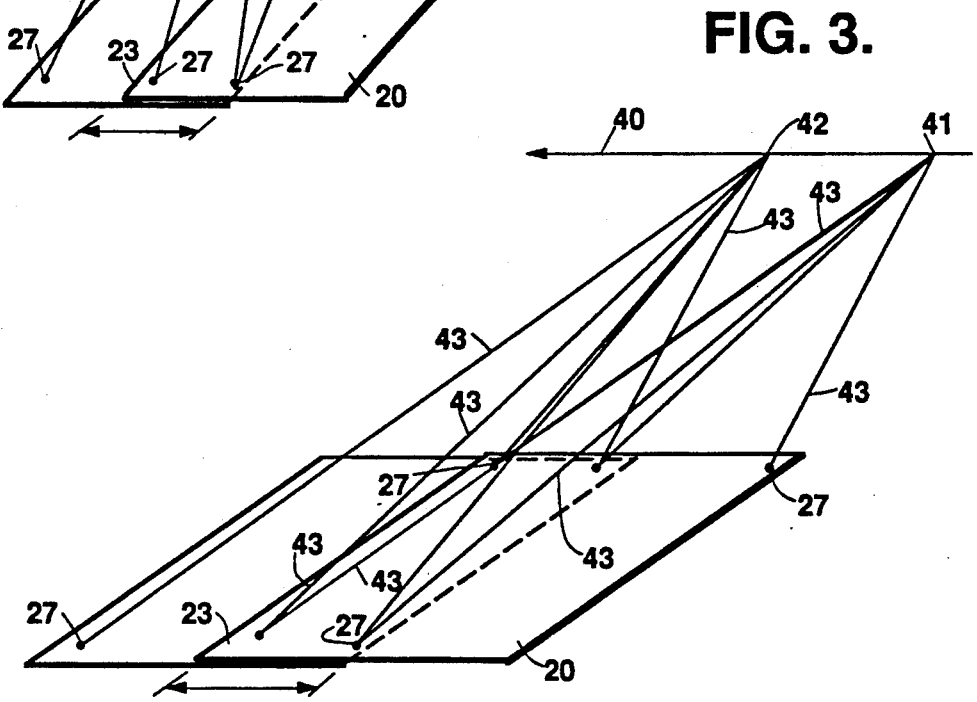
FIG. 3 is a diagram illustrating the geometric principle employed in the method of the present invention for generating a downlooking three-dimensional database from oblique sequential imagery.

Referring now to FIG. 3, there is shown a diagram illustrating the method of the present invention for generating a downlooking three-dimensional database from oblique sequential imagery. FIG. 3 generally corresponds to FIG. 2 in that the surface area 20 being photographed is the same. FIG. 3 also corresponds to FIG. 1 in that a vehicle traveling along a flight path 40 is taking sequential aerial photographs at two camera positions 41, 42 and with an oblique field of view. A plurality of lines 43 represent light rays that extend from the discrete points 27 on the surface area 20 to the camera positions 41, 42. The area of common coverage 23 that was seen in FIG. 2 also exists in FIG. 3 because the oblique field photographs are taken from slightly different vantage points at slightly different instants of time. Accordingly, a modified mathematical technique or method of stereo pairs is employed to automatically generate terrain elevation data, and to generate a downlooking database from the oblique sequential imagery.

Referring again to FIG. 1, the aircraft 10 flies over a known path 11 having known ground features that are used as ground control points. Corresponding maps are available giving the location and altitude of these ground control points. If available for the terrain of interest, data from the Defense Mapping Agency may be used to establish the initial coarse resolution x, y, z location data. Nothing needs to be done aboard the aircraft 10 except fly the preselected flight path 11 and aim the camera 14 along the oblique field of view indicated by the two lines 15, 16. Typically, the camera 14 takes pictures at the rate of thirty frames per second so that for a half hour flight 54,000 frames of photographs will have been made.

After the flight is finished, the film is removed from the camera 14 and processed. If the camera 14 is a motion picture camera, the film is processed using chemical processes and the frames are digitized. If the camera 14 is a video camera, the video signal is processed to obtain digitized photographs. It is possible to use a camera 14 that produces a digitized signal directly and that does not require any intermediate processing. Database generation from digital video or video tape does not require film processing nor film digitization. Once the sequential oblique digitized imagery is available, it is fed directly into an automatic database generating computer. No attempt is made at registration, radiometric balancing, orthorectification, or making a mosaic of multiple images. Thus, the technique of the present invention is less time-consuming and labor intensive than conventional techniques employing downlooking photographs. The method of the present invention uses less manual intervention and generates databases in a shorter period of time, from data acquisition through database completion.

The automatic database generating computer calculates the position of the aircraft 10 for each frame based on known ground control points on maps of the terrain. On the overlapping area of common coverage 23 in adjacent frames, the position of the aircraft 10 is calculated to the same ground feature from the displaced camera positions 41, 42. This process is continued with other additional points or ground features until about 20 common points have been calculated for adjacent frames. In addition to making calculations from frame-to-frame, the computer also skips over some frames and makes calculations of position from about every sixth frame. In this manner, the calculations are continually refined.

The automatic database generating computer makes use of modern extended Kalman filtering techniques to provide optimal estimates of the position and attitude of the aircraft 10 with respect to each frame of imagery. This provides a continuous smooth determination of the orientation of the camera at the moment of exposure of each frame. The Kalman filter estimation of the vehicle position and attitude is made with respect to six degrees of freedom: x, y, z and roll, pitch and yaw.

The automatic database generating computer makes use of a correlation filter to determine corresponding pixels in adjacent frames. The computer calculates range to these corresponding pixel surfaces from the displaced camera positions 41, 42, and determines the x, y and z position. The mathematics involved is a modified version of the existing mathematics used in the field of photogrammetry to solve the similar problem of stereo pairs. This was discussed above in connection with FIG. 2. The elevation data and radiometric data for each pixel is determined. The radiometric data is extracted only from the lower portion of each frame because it is closer to the camera. Referring to FIG. 1, note that the foreground line 16 is shorter than the background line 15. The radiometric data for each pixel is given in terms of eight digital bits which represent 256 elements of information. This may be in terms of red, blue, green colors or in levels of black and white gray scale.

After the elevation information and radiometric information for each pixel of each frame has been determined by the automatic database generation computer, the imagery is warped onto the elevation data to generate a top down view. This database is then used in an image generation system such as the CGSI system to generate realtime perspective images for simulation. Unlike conventional databases that are generated by digitizing downlooking photographs, the database made in accordance with the present invention provides a view of the sides of buildings, which is unique. When the conventional downlooking database is warped to get an oblique view, only an image of a warped roof is obtained, rather than an image of the side of the building.

Thus there has been described a method for automatically generating a downlooking database from oblique sequential photographic imagery. It is to be understood that the above-described method is merely illustrative of some of the many specific steps or variations which represent applications of the principles of the present invention. Clearly, numerous and other methods can be readily devised by those skilled in the art without departing from the scope of the invention.

What is claimed is:

1. A method for generating a downlooking three dimensional photographic database from oblique sequential imagery comprising the following steps:
    acquiring oblique forward looking sequential imagery data with respect to a vehicle moving over a terrain of interest for a plurality of frames;
    calculating the position and attitude of the vehicle in x, y, z and roll, pitch and yaw at the time each frame was made;
    determining corresponding pixels in adjacent frames;
    calculating range to corresponding pixels in each frame;
    using range information for corresponding pixels and photogrametric calculations to generate elevation data for each pixel in each frame; and
    determining radiometric data for each pixel in each frame using only radiometric data extracted from the lower portion of each frame; and
    storing the radiometric data and elevation data for each pixel to provide a three dimensional database suitable for use in an image generation system.

2. The method of claim 1 wherein the step of acquiring oblique forward looking sequential imagery frames comprises the step of:
    acquiring oblique forward looking sequential imagery data with respect to a vehicle moving over a terrain of interest; and
    digitizing the oblique forward looking sequential imagery frames.

3. The method of claim 1 wherein the step of acquiring oblique forward looking sequential imagery frames comprises the step of:
    digitally recording oblique forward looking sequential imagery frames from a vehicle moving over the terrain of interest.

4. The method of claim 1 wherein the step of determining corresponding pixels in adjacent frames comprises the step of:
    determining corresponding pixels in adjacent frames by use of a correlation filter.

5. The method of claim 1 wherein the step of calculating the position of the vehicle comprises the step of:
    estimating the exact position of the vehicle at the time each frame was made in x, y, z and roll, pitch and yaw using Kalman filter processing.

6. The method of claim 1 wherein the step of acquiring oblique forward looking imagery comprises the step of:
    recording oblique forward looking sequential imagery frames from a vehicle moving over the terrain of interest using a single recording camera.

7. A method for generating a downlooking three dimensional photographic database form oblique sequential imagery comprising the following steps:
    acquiring oblique forward looking sequential imagery data with respect to a vehicle moving over a terrain of interest using a single recording camera;
    digitizing the oblique forward looking sequential imagery frames;
    calculating the position and attitude of the vehicle in x, y, z and roll, pitch and yaw at the time each frame was made;
    determining corresponding pixels in adjacent frames using a correlation filter;
    calculating range to corresponding pixels in each frame;
    using range data for corresponding pixels and photogrammetric calculations to generate elevation data for each pixel in each frame;
    processing only radiometric data extracted from the lower portion of each frame to generate radiometric data for each pixel in the frame; and
    storing the elevation data and radiometric data for each pixel to generate a downlooking three dimensional database suitable for use in an image generation system.

8. The method claim 7 wherein the step of calculating position comprises the step of:
    estimating the exact position of the vehicle at the time each frame was made in x, y, z and roll, pitch and yaw using Kalman filter processing.

9. The method of claim 7 wherein the step of acquiring sequential frames comprises the step of:
    recording oblique forward looking sequential imagery frames from a vehicle moving over the terrain of interest using a single recording camera.

10. A method for generating a downlooking three dimensional database from oblique sequential imagery comprising the following steps:
    making oblique forward looking sequential imagery frames from a vehicle moving over a terrain of interest using a single camera for a plurality of frames;

digitizing the oblique forward looking sequential imagery;

loading the digitized oblique forward looking sequential imagery into a computer;

calculating the position of the vehicle in x, y, z and roll, pitch and yaw from known ground control positions at the time each frame was made;

estimating the exact position of the vehicle in x, y, z and roll, pitch and yaw using extended Kalman filtering techniques at the time each frame was made;

determining corresponding pixels in adjacent frames by use of a correlation filter;

calculating range to corresponding pixels in each frame using range data for each frame and photogrammetry calculations to determine elevation data for each pixel in each frame;

generating radiometric data for each pixel in each frame using only radiometric data extracted from the lower portion of each frame; and storing the radiometric data and the elevation data for each pixel to generate a top down view thus providing a downlooking three dimensional database suitable for use in an image generation system.

* * * * *